United States Patent
Deboard et al.

(10) Patent No.: US 11,860,180 B2
(45) Date of Patent: Jan. 2, 2024

(54) REMOVABLE MAINTENANCE FLUID HOLDER

(71) Applicant: Funai Electric Co., Ltd., Osaka (JP)

(72) Inventors: Bruce A. Deboard, Lexington, KY (US); Brian T. Jones, Lexington, KY (US); Michael A. Marra, III, Lexington, KY (US); Sam Norasak, Lexington, KY (US)

(73) Assignee: Funai Electric Co., Ltd.

( * ) Notice: Subject to any disclaimer, the term of this patent is extended or adjusted under 35 U.S.C. 154(b) by 484 days.

(21) Appl. No.: 16/786,142

(22) Filed: Feb. 10, 2020

(65) Prior Publication Data

US 2021/0247413 A1 Aug. 12, 2021

(51) Int. Cl.
*G01N 35/10* (2006.01)

(52) U.S. Cl.
CPC ..... *G01N 35/1004* (2013.01); *G01N 35/1002* (2013.01); *G01N 35/1083* (2013.01)

(58) Field of Classification Search
CPC ........... G01N 35/1004; G01N 35/1002; G01N 35/1083
USPC .................................. 73/864.81; 347/23, 24
See application file for complete search history.

(56) References Cited

U.S. PATENT DOCUMENTS

| | | | |
|---|---|---|---|
| 4,827,780 A | 5/1989 | Sarrine et al. | |
| 5,806,994 A * | 9/1998 | Coffy | B41J 2/16588 347/14 |
| 6,390,577 B1 * | 5/2002 | Fajour | G07B 17/00508 347/12 |
| 6,637,859 B2 | 10/2003 | Williamson et al. | |
| 7,594,711 B2 | 9/2009 | Sekino et al. | |
| 9,028,042 B2 | 5/2015 | Park | |
| 9,354,245 B2 | 5/2016 | Ueki et al. | |
| 9,453,787 B2 | 9/2016 | Foster et al. | |
| 10,228,367 B2 | 3/2019 | Stanwood et al. | |
| 2003/0071870 A1 | 4/2003 | Murcia et al. | |
| 2003/0112290 A1 * | 6/2003 | Spitz | B41J 2/16547 347/35 |
| 2003/0142166 A1 * | 7/2003 | Ciordia | B41J 2/16508 347/31 |
| 2004/0001119 A1 * | 1/2004 | Johnson | B41J 2/16508 347/36 |
| 2007/0097173 A1 | 5/2007 | Hubler et al. | |
| 2010/0182374 A1 | 7/2010 | Nakagaki et al. | |
| 2011/0080446 A1 | 4/2011 | Hayashi | |
| 2011/0102498 A1 * | 5/2011 | Miyazawa | B41J 2/16535 347/31 |
| 2012/0184037 A1 | 7/2012 | Schilffarth et al. | |
| 2013/0293632 A1 * | 11/2013 | Menzel | B41J 2/16552 347/28 |

(Continued)

*Primary Examiner* — Michael P Nghiem
(74) *Attorney, Agent, or Firm* — Luedeka Neely, P.C.

(57) ABSTRACT

A removable maintenance fluid holder for a digital dispense system, a digital dispense system containing the removable maintenance fluid holder, and a method of maintaining a fluid droplet dispense cartridge. The removable maintenance fluid holder includes a housing having a handle end and a fluid receptacle end distal from the handle end. The fluid receptable end includes a fluid receptacle for holding fluid dispensed from a fluid droplet ejection head of a fluid droplet cartridge in the digital dispense system. The removable maintenance fluid holder is configured to be inserted and removed from the digital dispense system on a periodic basis.

9 Claims, 4 Drawing Sheets

(56) References Cited

U.S. PATENT DOCUMENTS

2021/0247411 A1\* 8/2021 Jones ...................... B01L 9/523

\* cited by examiner

REMOVABLE MAINTENANCE FLUID HOLDER

TECHNICAL FIELD

The disclosure is directed to fluid droplet dispense devices that are used to accurately dispense one or more fluids onto or into precise areas of a substrate or for building up layers of material in predetermined areas on the substrate and to maintenance methods and apparatus for the fluid droplet dispense devices.

BACKGROUND AND SUMMARY

In the medical field, in particular, there is a need for automated sample preparation and analysis. The analysis may be colorimetric analysis or require the staining of samples to better observe the samples under a microscope. Such analysis may include drug sample analysis, blood sample analysis and the like. In the analysis of blood, for example, blood is analyzed to provide a number of different factors that are used to determine the health of an individual. When there are a large number of patients that require blood sample analysis, the procedures may be extremely time consuming. Also, there is a need for accurate preparation of the samples so that the results can be relied on. There are many other situations that require sample analysis in the medical field and in other fields that can benefit from the use of analytical instruments that provide accurate and reproduceable results, such as micro-titration of multiple samples.

Well plates, slides and other substrates are used for many experiments and laboratory procedures. The process of filling the wells or spotting is often performed manually or using expensive lab equipment. In some cases, the wells are filled with hand operated pipettes. In other cases, high-end automated devices based on pipette technology are used to fill the well plates. Such automated devices accommodate a dispense head that moves across a substrate to deposit fluid.

In the areas of micro-circuit manufacture, fluids are required to be dispensed in precise locations to provide circuit devices on a substrate. The volume of fluid dispensed per unit area is typically much greater than can be provided by conventional ink jet printing technology. In some cases, different fluids are combined together on the substrate to provide a chemical or physical change to the fluids so that the resulting material performs a desired circuit function.

Other areas of micro-manufacturing may also require the precise deposit of fluids into or onto a substrate. Ejection head fluid droplet cartridges are used to precisely deposit fluid onto various substrates. Precise deposition of fluid requires all nozzles of the ejection heads of the fluid droplet cartridges to be in pristine condition. In order to maintain the nozzles of the ejection head in pristine condition, a maintenance station is provided in the digital dispense device whereby all the nozzles of the ejection head are fired at regular intervals to maintain the pristine condition of the nozzles. Maintenance of the nozzles is required to prevent build of contaminants within the nozzles that may cause clogging or misfiring of the nozzles. Conventional printing devices typically use permanently installed maintenance stations. However, when using a fluid droplet dispense device for applications in which the fluids dispensed can vary to a much greater degree, the problem arises that some of the fluids may be incompatible with each other, and a permanent maintenance spit station is not a viable, safe solution for such applications. In addition, in some experiments, the remainder of the fluids in the ejection head will need to be disposed of safely in an approved manner. For example, some fluids may be characterized as biohazard waste materials.

Another problem associated with conventional, permanently installed maintenance stations is that a fine mist is often created as the ejection head dispenses fluid at the maintenance station location. FIG. 1 illustrates a schematic view of a fluid droplet dispense device 10 having a movable ejection head cartridge 12, a substrate 14 onto which a fluid 16 is deposited, and a maintenance station pad 18 for absorbing fluid ejected from nozzles of the ejection head cartridge 12 during maintenance of the nozzles. During a fluid ejection operation, the ejection head cartridge 12 moves back and forth in the x-direction of the arrow 20 across the substrate 14. During maintenance of the ejection head cartridge 12 as illustrated in FIG. 2, when the ejection head cartridge 12 is in the maintenance station location, a fine mist 22 is generated as fluid is ejected toward the maintenance station pad 18. The fine mist 22 may flow around the interior of the fluid droplet dispense device and settle on exposed surfaces. The degree of fluid misting is affected by the distance D1 between the nozzle plate of the ejection head cartridge 12 and the maintenance station pad 18. So if the maintenance station pad 18 is positioned too far away from the nozzle plate, more misting will occur. Accordingly, there is a need for an improved maintenance station for a fluid droplet dispense device to prevent contamination of the device components and to dispose of hazardous or biowaste fluids that may be dispensed by the device.

In view of the foregoing, an embodiment of the disclosure provides a removable maintenance fluid holder for a digital dispense system. The removable maintenance fluid holder includes a housing having a handle end and a fluid receptacle end distal from the handle end. The fluid receptacle end includes a fluid receptacle pad for holding fluid dispensed from a fluid droplet ejection head of a fluid droplet cartridge in the digital dispense system. The removable maintenance fluid holder is configured to be inserted and removed from the digital dispense system on a periodic basis.

In another embodiment there is provided a digital dispense system for ejection of fluids onto a substrate. The digital dispense system includes a housing unit and a fluid droplet ejection cartridge disposed in the housing unit. The fluid droplet ejection cartridge contains one or more fluids and is disposed on a fluid cartridge translation mechanism for moving the fluid droplet ejection cartridge back and forth in an x-direction within the housing unit. A substrate holder is provided for holding the substrate below the fluid droplet ejection cartridge. A maintenance station is disposed in the housing unit offset from the substrate holder for periodic maintenance of the fluid droplet ejection cartridge. The maintenance station includes a maintenance platform and a removable maintenance fluid holder having a handle and a fluid receptacle distal from the handle disposed on the maintenance platform. The housing unit has an opening therein for insertion and removal of the removable maintenance fluid holder.

In yet another embodiment there is provided a method for maintaining a fluid droplet dispense cartridge in a digital fluid dispense system. The method includes providing a housing unit and a fluid droplet ejection cartridge disposed in the housing unit, the fluid droplet ejection cartridge containing one or more fluids and being disposed on a fluid cartridge translation mechanism for moving the fluid droplet ejection cartridge back and forth in an x-direction within the housing unit. A substrate holder is provided for holding the substrate below the fluid droplet ejection cartridge during fluid dispensing of the one or more fluids onto the substrate. A maintenance station is disposed in the housing unit offset from the substrate holder for periodic maintenance of the fluid droplet ejection cartridge. The maintenance station includes a maintenance platform and a removable maintenance fluid holder having a handle and a fluid receptacle distal from the handle disposed on the maintenance platform. The fluid droplet ejection cartridge is periodically moved to the maintenance station, and fluid is ejected from the fluid droplet ejection cartridge onto the removable maintenance fluid holder for a predetermined period of time.

In some embodiments, the fluid receptable further contains an absorbent pad disposed therein. In other embodiments, the absorbent pad is removable from the housing for disposal. In some embodiments, the absorbent pad is made of absorbent fibers. In other embodiments, both the absorbent pad and the housing are disposable.

In some embodiments the removable maintenance fluid holder is configured to be inserted and removed through a front opening in the digital dispense system. In other embodiments, the housing is an elongate housing. In still other embodiments, the removable maintenance fluid holder is configured to be inserted and removed through a side opening in the digital dispense system. In some embodiments, the housing is an L-shaped housing.

In some embodiments, the fluid receptacle of the removable maintenance fluid holder is divided into two or more discrete fluid containing segments. In other embodiments, (i) fluid is ejected from a fluid droplet ejection cartridge into a first segment of the two or more segments of the removable maintenance fluid holder until the first segment is full of waste fluid, (ii) the fluid droplet ejection cartridge is then indexed to a next segment of the two or more segments and fluid is ejected into the next segment until the next segment is full. Step (ii) is repeated until all segments are full, then the disposable maintenance fluid holder is removed from the housing unit and disposed of.

In some embodiments, fluid is ejected onto the removable maintenance holder for a period of time sufficient to clean nozzles on a fluid droplet ejection cartridge. In other embodiments, fluid is ejected onto the removable maintenance holder for a period of time sufficient to empty fluid from the fluid droplet ejection cartridge.

An advantage of the disclosed embodiments is that it provides unique low-cost maintenance fluid holder that can be removed from the digital dispense system and disposed of in an environmentally safe manner. Another advantage is that the removable maintenance fluid holder may be disposed closer to the fluid ejection cartridge in order to avoid fluid misting during a maintenance procedure on the fluid ejection cartridge. Removable maintenance fluid holders may also enable a wider variety of fluids to be dispensed by the digital dispense device since a wide variety of absorbent pads that are compatible with the fluids to be dispensed may be used with the maintenance fluid holder. Other features and advantages of the disclosed embodiments may be evident by reference to the attached drawings and following disclosure.

DETAILED DESCRIPTION OF EXEMPLARY EMBODIMENTS

Figure 3:
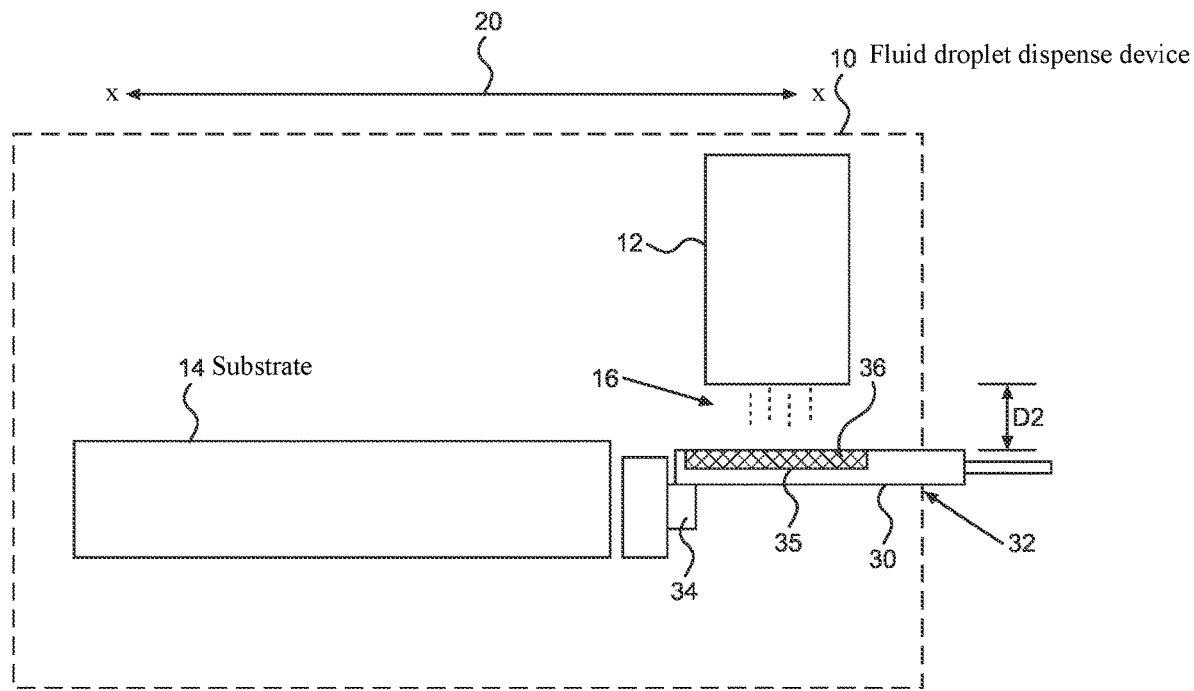
FIG. 3 is a schematic view of a digital dispense system containing a removable maintenance fluid holder according to an embodiment of the disclosure.
Figure 4:
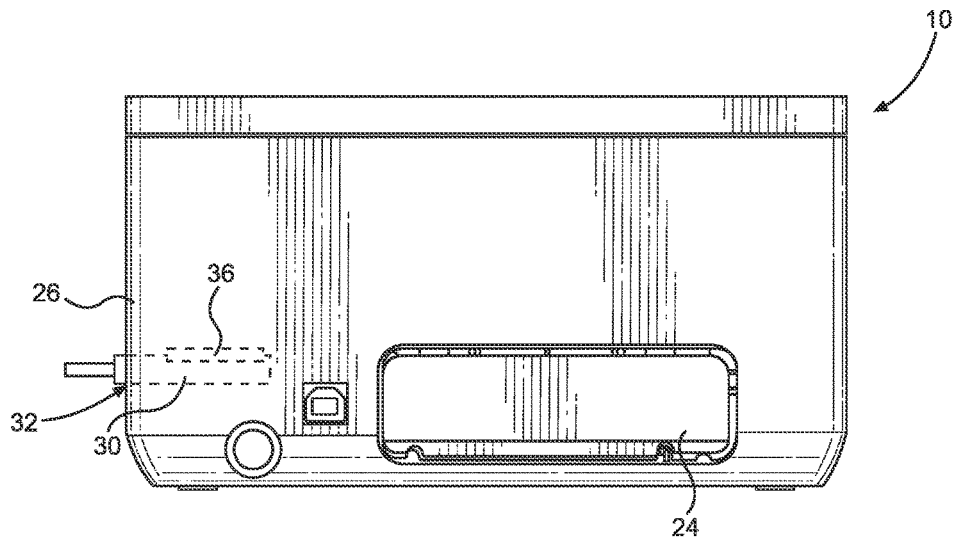
FIG. 4 is an elevational view, not to scale, of a back side of a digital dispense system showing a side location of a removable maintenance fluid holder according to one embodiment of the disclosure.

With reference to FIGS. 3 and 4 there is shown a digital dispense device 10 for accurately dispensing an amount of one or more fluids onto a substrate 14 from a fluid droplet ejection cartridge 12 that moves in a direction of arrow 20 across the substrate 14. In some embodiments, the substrate 14 may be moved by a tray in a direction orthogonal to the direction of movement of the fluid droplet ejection cartridge 12 during a fluid deposition process. Accordingly, a rear opening 24 may be provided in the housing 26 of the digital dispense device for movement of the substrate therethrough. According to an embodiments of the disclosure, the digital dispense device 10 includes a removable maintenance fluid holder 30 that is removably disposed through an opening 32 in the digital dispense device 10. In the embodiment illustrated in FIGS. 3 and 4, the opening 32 is a side opening in the housing 26 of the digital dispense device 10.

Figure 1:
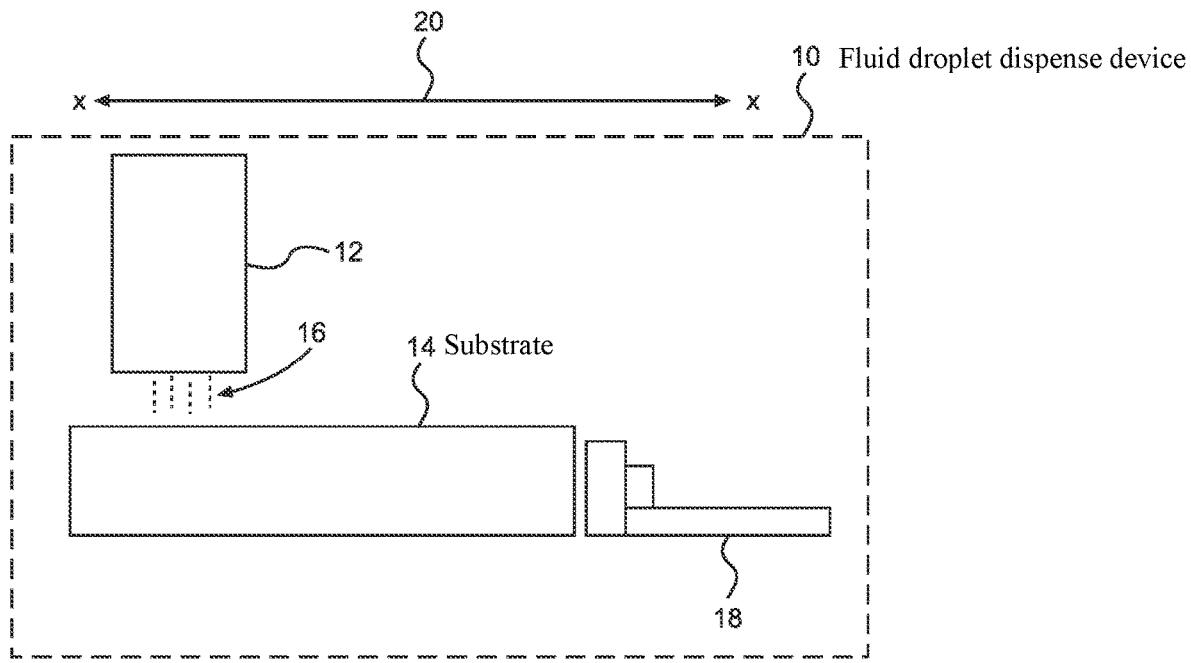
FIGS. 1 and 2 are schematic views of prior art digital dispense systems showing maintenance stations therefor.
Figure 2:
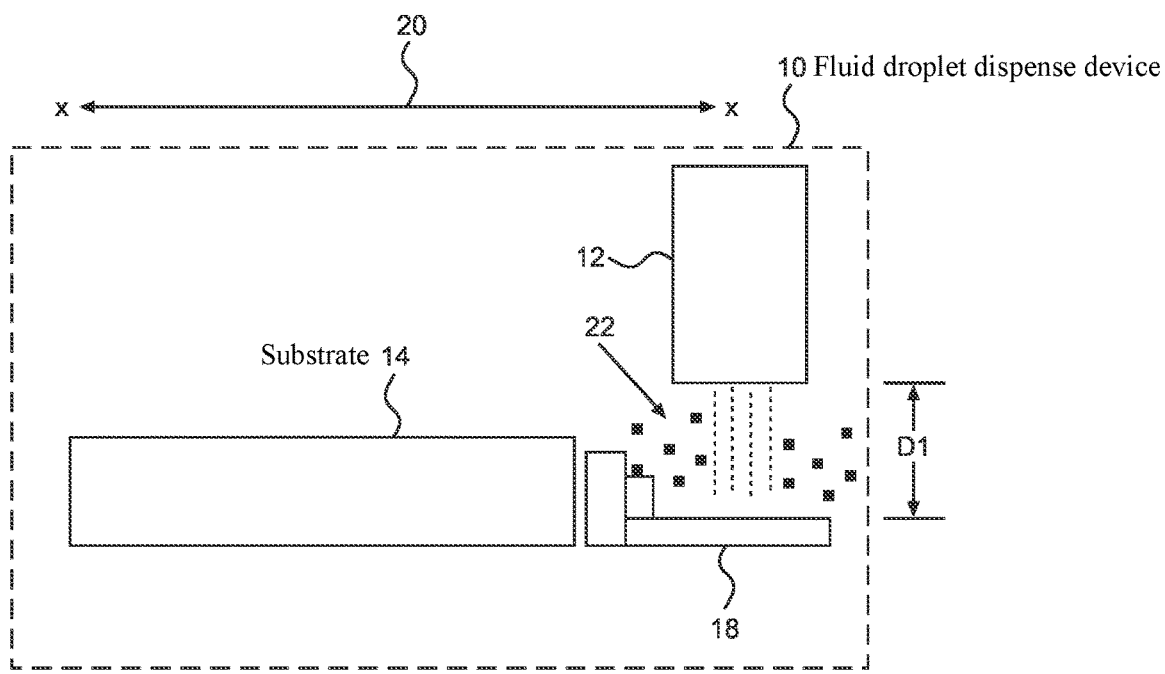

As shown in FIG. 3, the removable maintenance fluid holder is supported in the digital dispense device by a maintenance platform 34 in a maintenance area of the digital dispense device remote from the substrate 14. During maintenance of the fluid droplet ejection cartridge 12, fluid 16 is dispensed from the cartridge 12 into a fluid receptacle 35 or onto an absorbent pad 36 in the fluid receptacle 35 of the removable maintenance fluid holder 30. As shown in FIG. 3, the removable maintenance fluid holder 30 is supported in the maintenance area of the digital dispense device at a distance D2 that is substantially less than the distance D1 of FIG. 2. The distance D2 may range from about 1 mm to about 2 mm or more. However, the smaller the gap, the lower the amount of misting of fluid during a maintenance procedure.

Figure 5:
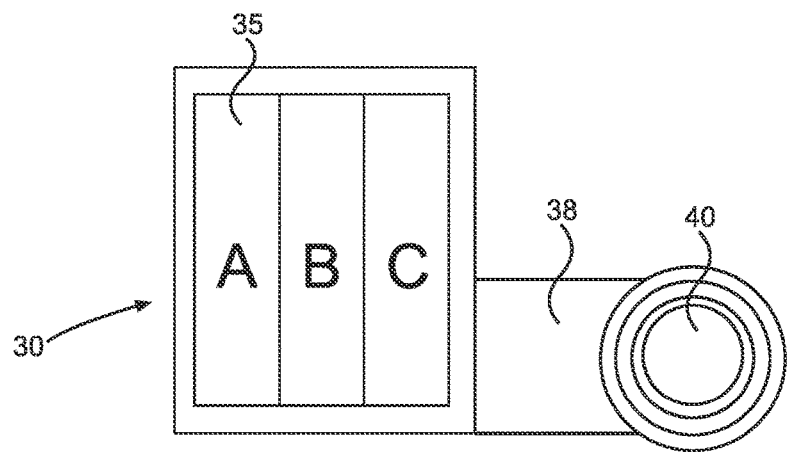
FIG. 5 is a plan view, not to scale, of a removable maintenance fluid holder according to a first embodiment of the disclosure.
Figure 6:
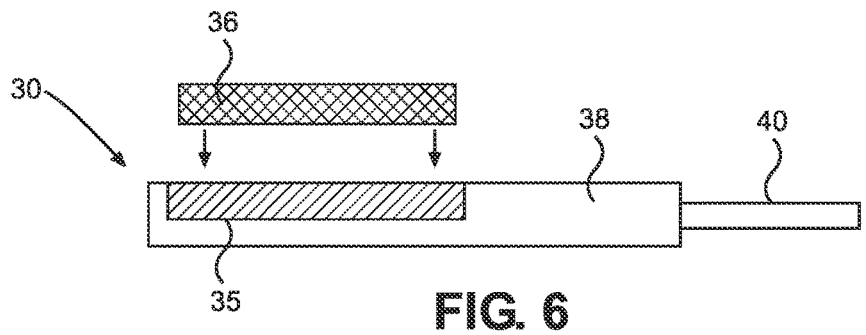
FIG. 6 is an elevational, exploded view, not to scale, of the removable maintenance holder of FIG. 5.

In one embodiment, the removable maintenance fluid holder 30 has an L-shaped housing 38 (FIG. 5) that includes the fluid receptacle 35 and a handle 40 distal from the fluid receptacle. In some embodiments, the fluid receptacle 35 has a single fluid containment area. In another embodiment, the fluid receptacle is segmented into two or more discrete non-staggered areas (areas A, B, and C shown for illustration purposes). In some embodiments, discrete non-staggered areas A, B, and C of the fluid receptacle may be separated by a plastic or metal partition between the segments to prevent fluids from mixing together in the fluid receptacle 35. In some embodiments, as shown in FIG. 6, an absorbent pad 36 may be removably or fixedly attached in the fluid receptacle 5. Accordingly, any one or more of the discrete non-staggered segments of the fluid receptacle 35 may contain an absorbent pad 36. Different types of absorbent pads 36 may be used in each of the discrete segments at the same time.

During maintenance of the fluid droplet ejection cartridge 12, the cartridge may be moved over the fluid receptacle 35, or over one of the discrete areas A, B, or C of the fluid receptacle 35 so that fluid may be dispensed into one discrete area at a time until that area is saturated or filled with fluid, then a next segment or area may be used for fluid maintenance until all segments have been saturated or filled with fluid. At that point the removable maintenance fluid holder 30 may be removed from the device 10 and disposed of, such as in a biohazard collection bin. In some embodiments, fluid may be dispensed in one or more of the discrete areas A, B, or C of the fluid receptacle 35 while the fluid droplet ejection cartridge 12 is moving incrementally in the maintenance area of the digital dispense device 10.

In some embodiments, as shown in FIG. 6, the absorbent pad 36 may be removable from the housing 38 and disposed of and the housing 38 reused. In this embodiment, the removable pad may be disposed in the fluid receptacle area of the housing 38.

Figure 7:
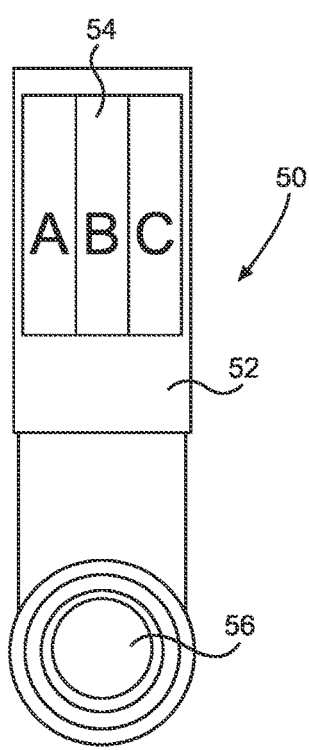
FIG. 7 plan view, not to scale, of a removable maintenance holder according to a second embodiment of the disclosure.

FIG. 7 illustrates an alternative embodiment of the removable maintenance fluid holder 50. In this embodiment, the removable maintenance holder 50 has an elongate housing 52 that includes fluid receptacle 54 that may be segmented as described above and a handle 56 that is distal from the fluid receptacle 54. As in the previous embodiment, the entire removable maintenance fluid holder 50 may be disposable or an absorbent pad disposed in the fluid receptacle 54 may be removable from the housing 52 so that only the absorbent pad is disposed of.

Figure 8:
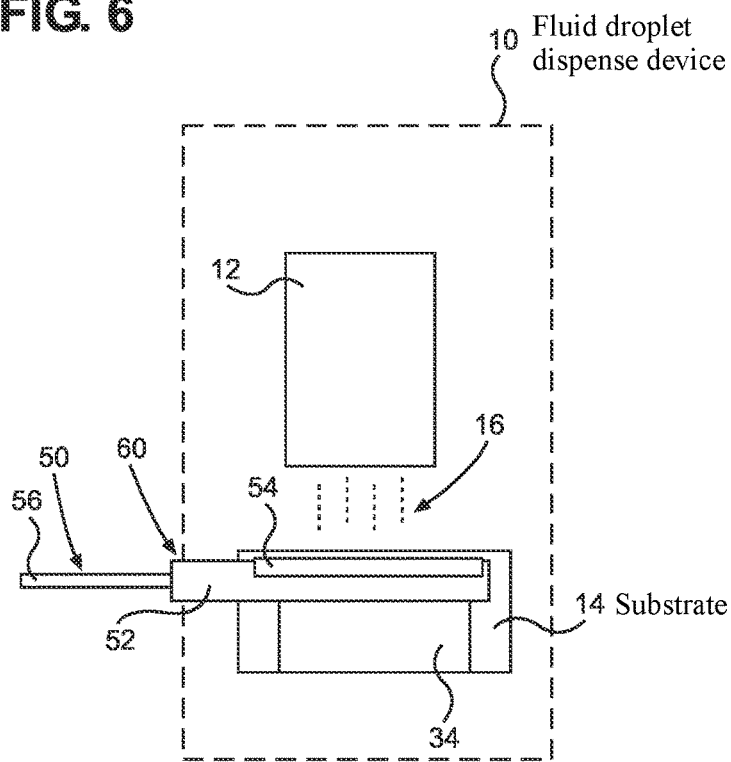
FIG. 8 is a schematic side view of a digital dispense system having a maintenance holder removable from a front of a digital dispense system according to another embodiment of the disclosure.
Figure 9:
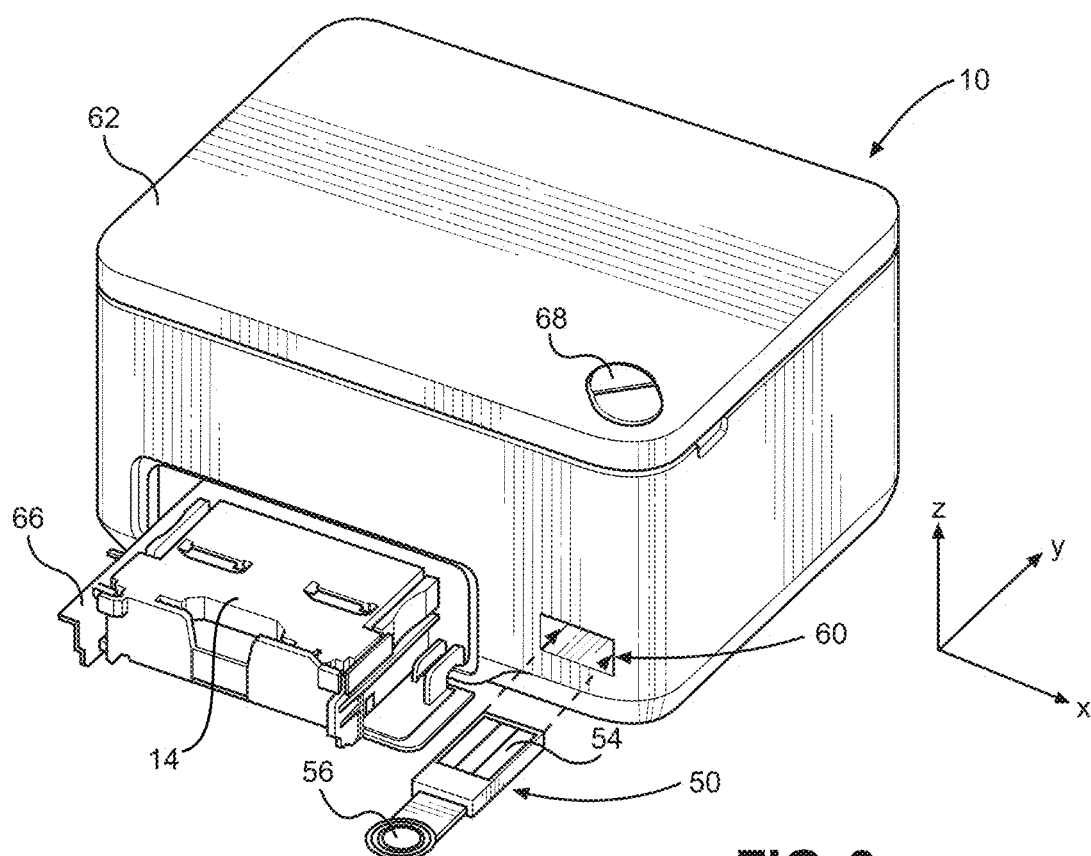
FIG. 9 is a perspective view, not to scale, of the digital dispense system of FIG. 8.
Figure 10:
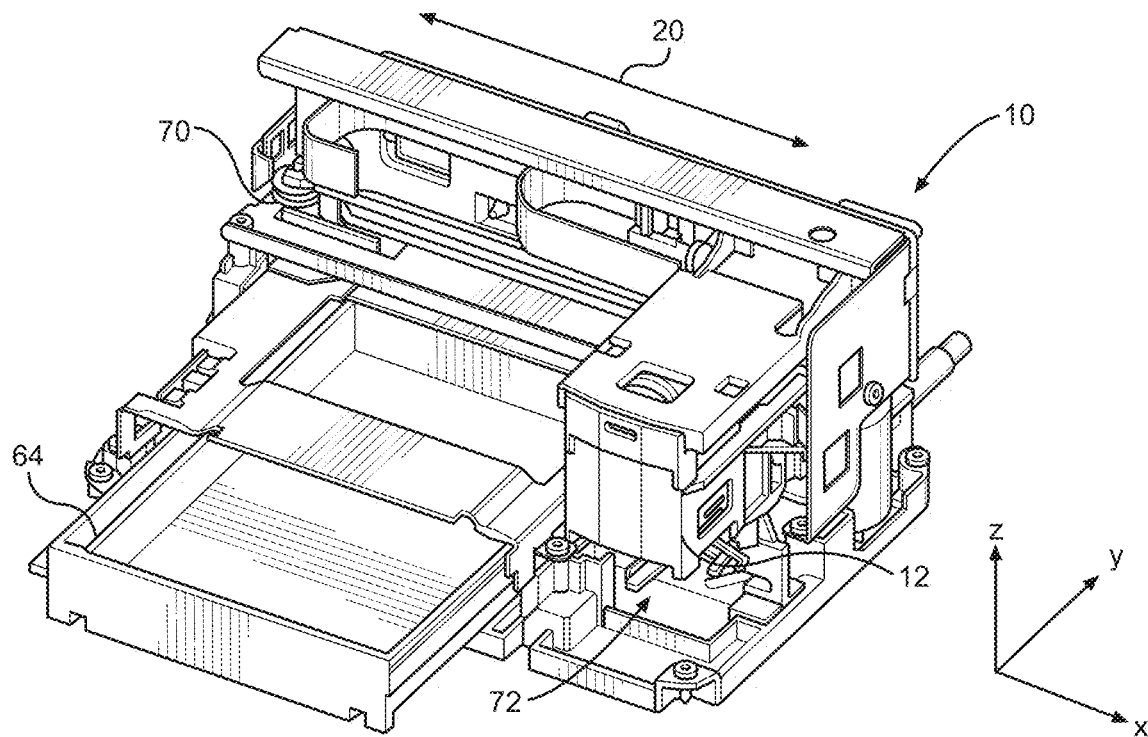
FIG. 10 is an inside perspective view, not to scale, of the digital dispense system of FIG. 9.

In another embodiment, illustrated in FIGS. 8-10, the removable maintenance fluid holder 30 or 50 may be inserted and removed from the digital dispense device 10 through a front opening 60 in the housing unit 62 of the digital dispense device. Once the removable maintenance fluid holder 30 or 50 is inserted through the front opening 60 and a substrate 14 is disposed on a substrate holder 64 of a movable tray mechanism 66, a power button 68 may be pushed to turn on the device 10. As shown in FIG. 10, a carriage translation mechanism 70 is used to move the fluid droplet ejection cartridge 12 over the substrate 14 during a fluid dispense procedure in the x-direction of arrow 20 or toward a maintenance area 72 for depositing fluid onto the removable maintenance fluid holder 50.

In the embodiments described herein, the removable maintenance housings may be made of a variety of materials including metals, plastics and ceramics. The absorbent pads may be made of absorbent fibers, felt pads and fibers treated with absorbent polymers. The materials for the absorbent pads are desirably selected from materials that are compatible with the fluids being ejected from the fluid droplet ejection cartridges.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method for maintaining a fluid droplet ejection cartridge in a digital fluid dispense system, the method comprising:
providing a housing unit and a fluid droplet ejection cartridge disposed in the housing unit, the fluid droplet ejection cartridge comprising one or more fluids and being disposed on a fluid cartridge translation mechanism for moving the fluid droplet ejection cartridge back and forth in an X-direction within the housing unit; a substrate holder for holding the substrate below the fluid droplet ejection cartridge during fluid dispensing of the one or more fluids onto the substrate; and a maintenance station disposed in the housing unit remote from the substrate holder having a removable fluid receptacle having two or more discrete fluid containing segments thereon configured to prevent fluids from mixing together in the fluid receptacle;
periodically moving the fluid droplet ejection cartridge to the maintenance station; and
(i) ejecting fluid from the fluid droplet ejection cartridge for a predetermined period of time into a first segment of the fluid receptacle until the first segment is full, (ii) then indexing the fluid droplet ejection cartridge to a next segment of the two or more segments of the fluid receptacle and ejecting fluid into the next segment until the next segment is full, and (iii) repeating step (ii) until each of the two or more segments of the fluid receptacle are full, then (iv) removing the fluid receptacle from the housing unit, and (v) disposing of the fluid receptacle.

2. The method of claim 1, wherein the fluid receptacle has a handle and is configured to be inserted and removed through an opening in the housing unit.

3. The method of claim 1, wherein the fluid receptacle comprises a removable absorbent pad disposed therein.

4. A method for maintaining a fluid droplet ejection cartridge in a digital fluid dispense system, the method comprising:
providing a housing unit and a fluid droplet ejection cartridge disposed in the housing unit, the fluid droplet ejection cartridge containing two or more fluids and being disposed on a fluid cartridge translation mechanism for moving the fluid droplet ejection cartridge back and forth in an X-direction within the housing unit; a substrate holder for holding a substrate below the fluid droplet ejection cartridge during fluid dispensing of the one or more fluids onto the substrate; and a maintenance station disposed in the housing unit remote from the substrate holder and having a removable fluid receptacle, wherein the fluid receptacle is divided into two or more segments with each segment corresponding to one of the two or more fluids of the fluid droplet ejection cartridge;

periodically moving the fluid droplet ejection cartridge to the maintenance station; and
  (i) ejecting a first one of the two or more fluids from the fluid droplet ejection cartridge into a first one of the two or more segments for a predetermined period of time,
  (ii) indexing the fluid droplet ejection cartridge to a next segment of the fluid receptacle and ejecting a second of the two or more fluids from the fluid droplet ejection cartridge into a second one of the two or more segments for a predetermined period of time, and
  (iii) repeating step (ii) until each of the two or more segments are full.

5. The method of claim 4, wherein the fluid receptacle has a handle and is configured to be inserted and removed through an opening in the housing unit.

6. The method of claim 5, wherein the fluid receptacle comprises a removable absorbent pad disposed therein.

7. The method of claim 6 wherein the removable absorbent pad is disposable.

8. The method of claim 6, wherein the removable absorbent pad is made of a material compatible with the fluid droplet ejection cartridge.

9. The method of claim 5, wherein the fluid receptacle is configured to be inserted and removed through a front opening in the housing unit.

* * * * *